United States Patent
Yoo et al.

(10) Patent No.: US 12,408,000 B2
(45) Date of Patent: Sep. 2, 2025

(54) METHOD OF PROCESSING MESH DATA FOR PROCESSING AUDIO SIGNAL FOR AUDIO RENDERING IN VIRTUAL REALITY SPACE

(71) Applicant: Electronics and Telecommunications Research Institute, Daejeon (KR)

(72) Inventors: Jae-Hyoun Yoo, Daejeon (KR); Kyeongok Kang, Daejeon (KR); Yong Ju Lee, Daejeon (KR); Dae Young Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 253 days.

(21) Appl. No.: 18/090,070

(22) Filed: Dec. 28, 2022

(65) Prior Publication Data

US 2023/0224669 A1    Jul. 13, 2023

(30) Foreign Application Priority Data

Jan. 13, 2022 (KR) .......... 10-2022-0005537
Oct. 28, 2022 (KR) .......... 10-2022-0141551

(51) Int. Cl.
*H04R 5/00* (2006.01)
*G06T 7/73* (2017.01)
*H04S 7/00* (2006.01)

(52) U.S. Cl.
CPC .......... *H04S 7/305* (2013.01); *G06T 7/73* (2017.01); *H04S 2400/11* (2013.01)

(58) Field of Classification Search
CPC .................. H04S 7/305; G06T 7/73
See application file for complete search history.

(56) References Cited

U.S. PATENT DOCUMENTS

| | | | | |
|---|---|---|---|---|
| 6,379,212 B1 * | 4/2002 | Miller | ........... | A63H 33/084 |
| | | | | 446/85 |
| 8,237,706 B2 | 8/2012 | Lee et al. | | |
| 11,915,456 B2 * | 2/2024 | Olivier | ........... | H04N 19/597 |
| 2002/0058456 A1 * | 5/2002 | Miller | ........... | A63H 33/084 |
| | | | | 446/85 |
| 2013/0120365 A1 | 5/2013 | Lee et al. | | |
| 2013/0211791 A1 | 8/2013 | Tsai et al. | | |
| 2016/0140119 A1 * | 5/2016 | Ishii | ........... | G06F 30/00 |
| | | | | 707/738 |
| 2019/0158973 A1 | 5/2019 | Thakur et al. | | |
| 2021/0124917 A1 * | 4/2021 | Wang | ........... | G06T 17/00 |
| 2021/0125371 A1 * | 4/2021 | Wang | ........... | G06T 7/74 |

(Continued)

FOREIGN PATENT DOCUMENTS

| | | |
|---|---|---|
| KR | 10-0269431 | 10/2000 |
| KR | 10-1381811 | 4/2014 |

*Primary Examiner* — Simon King
(74) *Attorney, Agent, or Firm* — KILE PARK REED & HOUTTEMAN PLLC

(57) ABSTRACT

Provided is a method of processing mesh data for processing an audio signal for audio rendering in a virtual reality (VR) space. The method includes receiving mesh data defining geometry of a certain space and the mesh data includes data regarding three-dimensional (3D) coordinates of points for configuring spatial information of the certain space and processing the mesh data by identifying outermost points among the points.

7 Claims, 6 Drawing Sheets

(56) References Cited

U.S. PATENT DOCUMENTS

| | | |
|---|---|---|
| 2021/0183125 A1 | 6/2021 | Shin et al. |
| 2022/0014841 A1 | 1/2022 | Kim et al. |
| 2023/0059516 A1* | 2/2023 | Schwarz .............. H04N 19/179 |
| 2023/0068178 A1* | 3/2023 | Schwarz .............. H04N 13/388 |
| 2023/0119830 A1* | 4/2023 | Schwarz ................ H04N 19/14 |
| | | 375/240.08 |
| 2024/0029353 A1* | 1/2024 | Wang ...................... G06T 17/10 |
| 2024/0070924 A1* | 2/2024 | da Silva Pratas Gabriel .............. |
| | | H04N 19/597 |
| 2024/0171775 A1* | 5/2024 | Su .......................... H04N 19/20 |
| 2024/0179346 A1* | 5/2024 | Hur ..................... H04N 19/139 |

* cited by examiner

METHOD OF PROCESSING MESH DATA FOR PROCESSING AUDIO SIGNAL FOR AUDIO RENDERING IN VIRTUAL REALITY SPACE

CROSS-REFERENCE TO RELATED APPLICATIONS

This application claims the benefit of Korean Patent Application No. 10-2022-0005537 filed on Jan. 13, 2022, and Korean Patent Application No. 10-2022-0141551 filed on Oct. 28, 2022, in the Korean Intellectual Property Office, the entire disclosure of which is incorporated herein by reference for all purposes.

BACKGROUND

1. Field of the Invention

One or more embodiments relate to a technical field of processing an audio signal.

2. Description of the Related Art

A virtual reality (VR) space sound information, which is descriptive information for audio rendering in a VR space, includes mesh data, which is not easy to utilize compared to relatively intuitive audio information. That is, it becomes difficult to intuitively utilize the mesh data when reverberation processing based on a reverberation time 60 decibel dB (RT60) value or obstacle processing is required in the space. In particular, mesh data for buildings with complex structures is usually very complex, and when sound in the interior space of the building is to be processed based on the mesh data for this complex building, calculating the area of the space itself may greatly increase the amount of computation.

SUMMARY

Embodiments provide technology for processing mesh data for processing an audio signal by a small amount of computation.

Embodiments provide the technical goal obtainable from the present disclosure and are not limited to the above-mentioned technical goal, and other unmentioned technical goals may be clearly understood from the following description by those having ordinary skill in the technical field to which the present disclosure pertains.

According to one aspect, there is provided a method of processing mesh data for processing an audio signal for audio rendering in a virtual reality (VR) space including receiving mesh data configured to define the geometry of a certain space, and the mesh data includes data regarding three-dimensional (3D) coordinates of points for configuring spatial information of the certain space and processing the mesh data by identifying the outermost points among the points.

Each of the 3D coordinates includes an X coordinate, a Y coordinate, and a Z coordinate, and the processing of the mesh data by identifying the outermost points among the points includes defining a coordinate having a minimum value among X coordinates of the 3D coordinates as a minimum X coordinate, defining a coordinate having a maximum value among the X coordinates of the 3D coordinates as a maximum X coordinate, defining a coordinate having a minimum value among Y coordinates of the 3D coordinates as a minimum Y coordinate, defining a coordinate having a maximum value among the Y coordinates of the 3D coordinates as a maximum Y coordinate, defining a coordinate having a minimum value among Z coordinates of the 3D coordinates as a minimum Z coordinate, defining a coordinate having a maximum value among the Z coordinates of the 3D coordinates as a maximum Z coordinate, and identifying the outermost points based on the minimum X coordinate, the maximum X coordinate, the minimum Y coordinate, the maximum Y coordinate, the minimum Z coordinate, and the maximum Z coordinate.

The identifying of the outermost points based on the minimum X coordinate, the maximum X coordinate, the minimum Y coordinate, the maximum Y coordinate, the minimum Z coordinate, and the maximum Z coordinate includes selecting eight points among the points using the minimum X coordinate, the maximum X coordinate, the minimum Y coordinate, the maximum Y coordinate, the minimum Z coordinate, and the maximum Z coordinate.

The selecting of the eight points among the points using the minimum X coordinate, the maximum X coordinate, the minimum Y coordinate, the maximum Y coordinate, the minimum Z coordinate, and the maximum Z coordinate includes selecting a point having a first coordinate including the minimum X coordinate, the minimum Y coordinate, and the minimum Z coordinate, selecting a point having a second coordinate including the minimum X coordinate, the minimum Y coordinate, and the maximum Z coordinate, selecting a point having a third coordinate including the maximum X coordinate, the minimum Y coordinate, and the minimum Z coordinate, selecting a point having a fourth coordinate including the maximum X coordinate, the minimum Y coordinate, and the maximum Z coordinate, selecting a point having a fifth coordinate including the minimum X coordinate, the maximum Y coordinate, and the minimum Z coordinate, selecting a point having a sixth coordinate including the minimum X coordinate, the maximum Y coordinate, and the maximum Z coordinate, selecting a point having a seventh coordinate including the maximum X coordinate, the maximum Y coordinate, and the minimum Z coordinate, and selecting a point having an eighth coordinate including the maximum X coordinate, the maximum Y coordinate, and the maximum Z coordinate.

Additional aspects of embodiments will be set forth in part in the description which follows and, in part, will be apparent from the description, or may be learned by practice of the disclosure.

According to embodiments, there is a technical effect processable an audio signal by a small amount of computation by processing mesh data.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
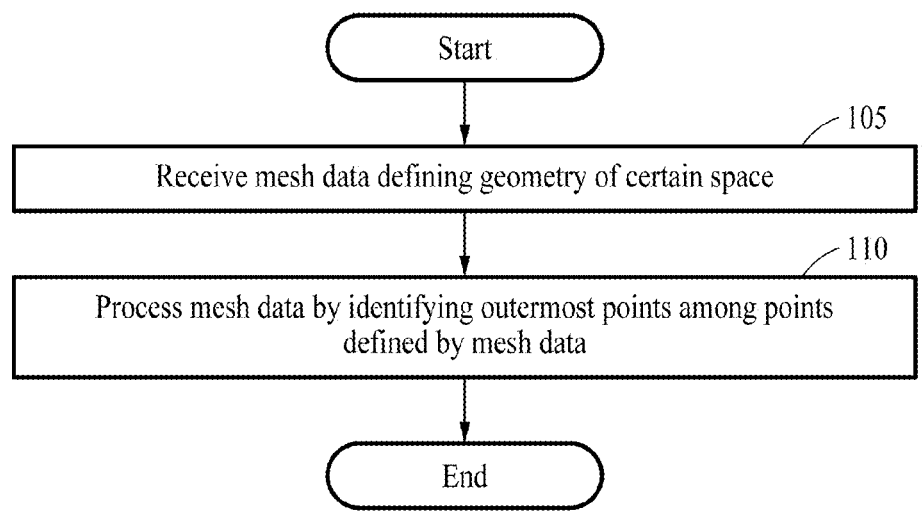
FIG. 1 is a diagram illustrating a method of processing mesh data for processing an audio signal for audio rendering in a virtual reality (VR) space according to an embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and any repeated description related thereto will be omitted.

FIG. 1 is a diagram illustrating a method of processing mesh data for processing an audio signal for audio rendering in a virtual reality (VR) space according to an embodiment.

As shown in FIG. 1, a method of processing mesh data starts from operation 105 of receiving mesh data defining geometry of a certain space. The VR contents including VR spatial sound information which is descriptive information, audio, and video, mostly include mesh data. The mesh data may define spatial information of a certain building or structure, that is, vertices of an outline of the certain building or structure. In the present disclosure, the vertices of the outline of the certain building or structure will be referred to as "points." The mesh data may include data regarding three-dimensional (3D) coordinates of points for forming spatial information of the certain space. Here, each of the 3D coordinates includes an X coordinate, a Y coordinate, and a Z coordinate. For example, under the assumption that there is a church structure shown in FIGS. 2 and 3, the mesh data defining such a church structure will be very complex. FIG. 4 is a diagram illustrating examples of points defined by mesh data for a church structure of FIGS. 2 and 3 according to an embodiment. In operation 110, mesh data is processed by identifying outermost points among points defined by mesh data.

Figure 5:
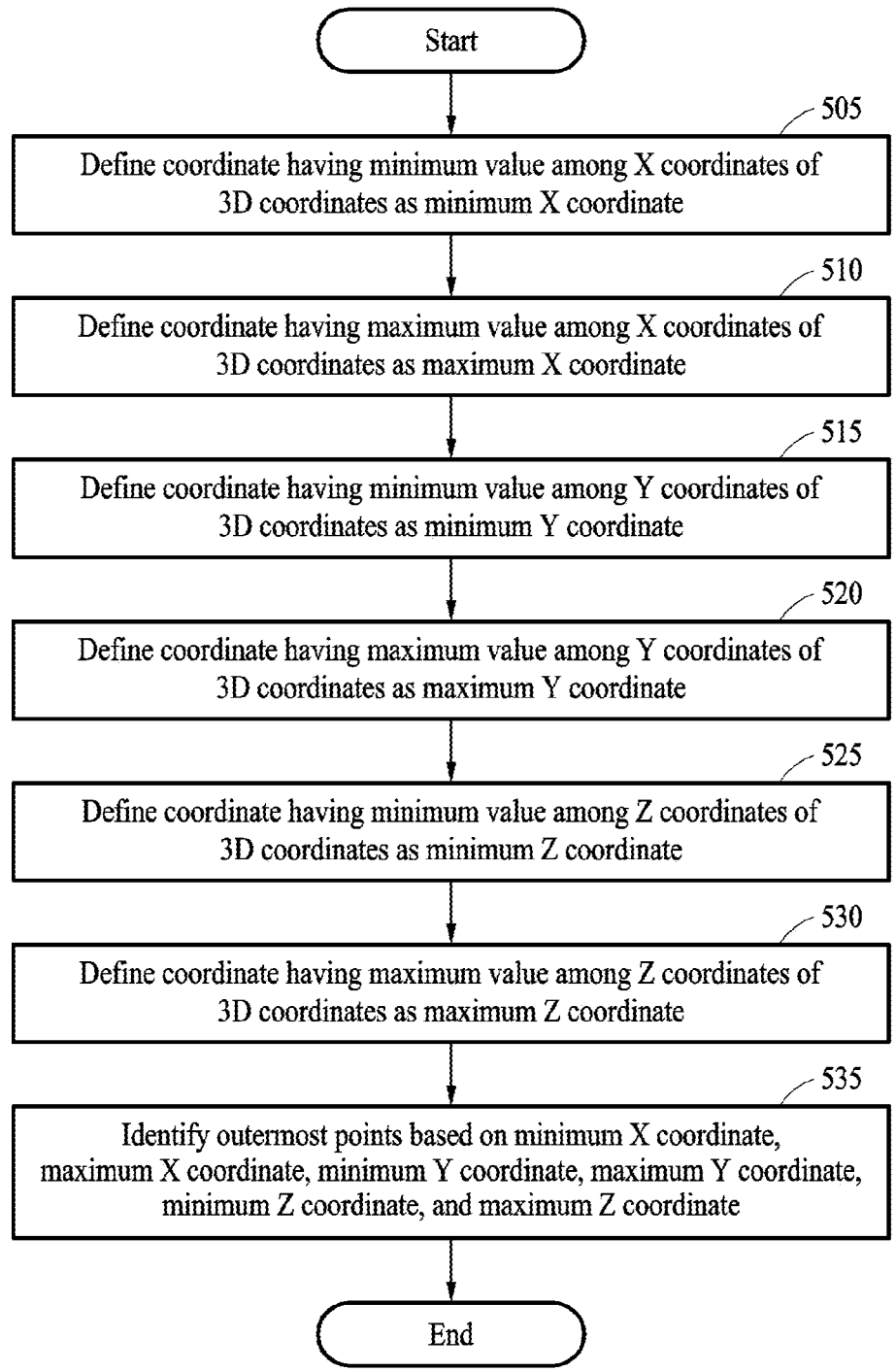
FIG. 5 is a flowchart illustrating a detailed procedure for processing mesh data of FIG. 1 according to an embodiment.

FIG. 5 is a flowchart illustrating a detailed procedure for processing mesh data of FIG. 1 according to an embodiment.

First, in operation 505, a coordinate having a minimum value among X coordinates of 3D coordinates is defined as a minimum X coordinate. In operation 510, a coordinate having a maximum value among the X coordinates of the 3D coordinates is defined as a maximum X coordinate. In operation 515, a coordinate having a minimum value among Y coordinates of the 3D coordinates is defined as a minimum Y coordinate. In operation 520, a coordinate having a maximum value among the Y coordinates of the 3D coordinates is defined as a maximum Y coordinate. In operation 525, a coordinate having a minimum value among Z coordinates of the 3D coordinates is defined as a minimum Z coordinate. In operation 530, a coordinate having a maximum value among the Z coordinates of the 3D coordinates is defined as a maximum Z coordinate. In operation 535, outermost points are identified based on the minimum X coordinate, the maximum X coordinate, the minimum Y coordinate, the maximum Y coordinate, the minimum Z coordinate, and the maximum Z coordinate.

Figure 6:
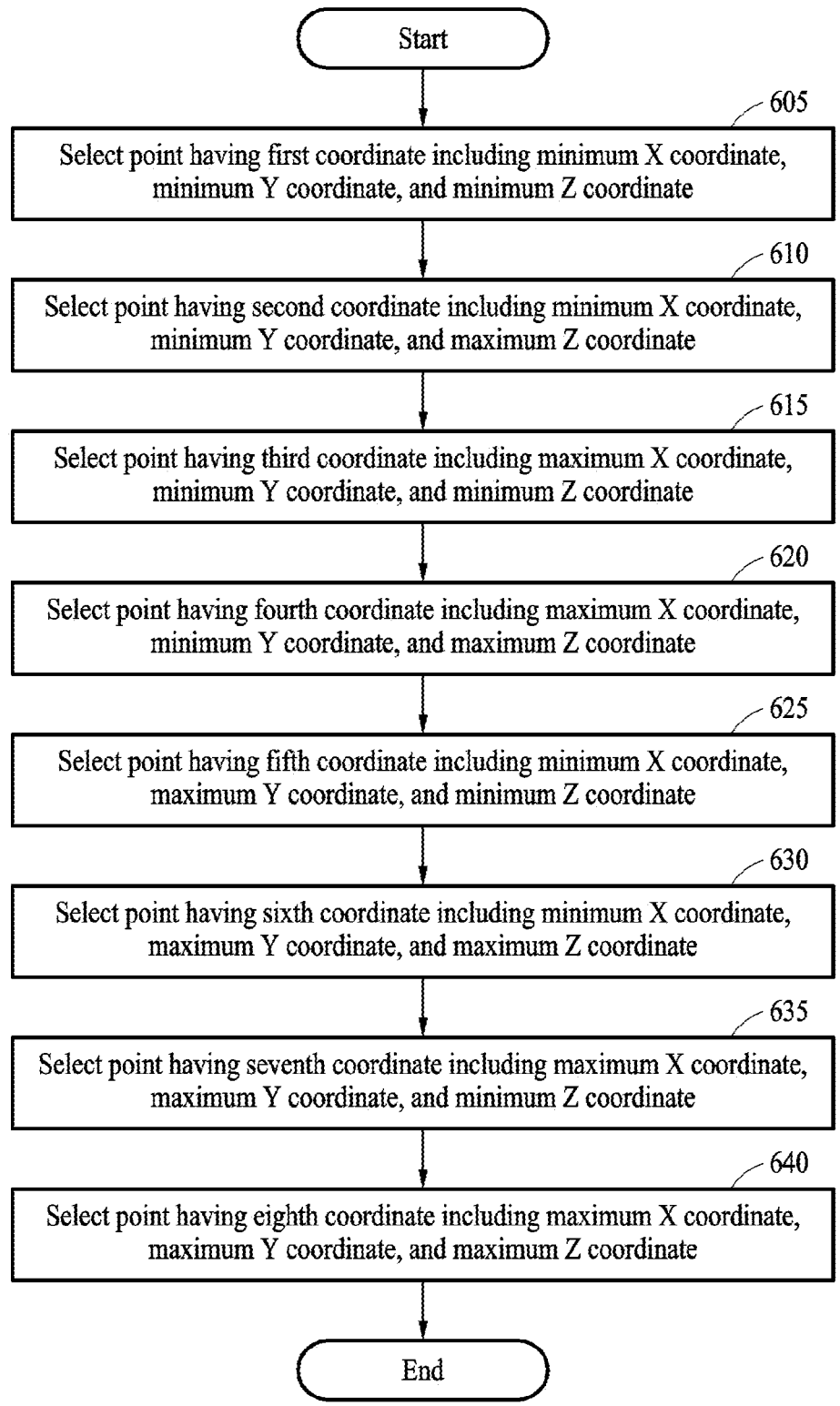
FIG. 6 is a flowchart illustrating a detailed procedure of operation of FIG. 5 according to an embodiment.

FIG. 6 is a flowchart illustrating a detailed procedure of operation 535 of FIG. 5 according to an embodiment.

Referring to FIG. 6, a procedure of selecting eight points among points defined by mesh data using the minimum X coordinate, the maximum X coordinate, the minimum Y coordinate, the maximum Y coordinate, the minimum Z coordinate, and the maximum Z coordinate is performed. In operation 605, a point having a first coordinate including the minimum X coordinate, the minimum Y coordinate, and the minimum Z coordinate is selected. In operation 610, a point having a second coordinate including the minimum X coordinate, the minimum Y coordinate, and the maximum Z coordinate is selected. In operation 615, a point having a third coordinate including the maximum X coordinate, the minimum Y coordinate, and the minimum Z coordinate is selected. In operation 620, a point having a fourth coordinate including the maximum X coordinate, the minimum Y coordinate, and the maximum Z coordinate is selected. In operation 625, a point having a fifth coordinate including the minimum X coordinate, the maximum Y coordinate, and the minimum Z coordinate is selected. In operation 630, a point having a sixth coordinate including the minimum X coordinate, the maximum Y coordinate, and the maximum Z coordinate is selected. In operation 635, a point having a seventh coordinate including the maximum X coordinate, the maximum Y coordinate, and the minimum Z coordinate is selected. In operation 640, a point having an eighth coordinate including the maximum X coordinate, the maximum Y coordinate, and the maximum Z coordinate is selected.

Figure 2:
FIGS. 2 and 3 are diagrams illustrating photographs of a church structure according to an embodiment.
Figure 3:
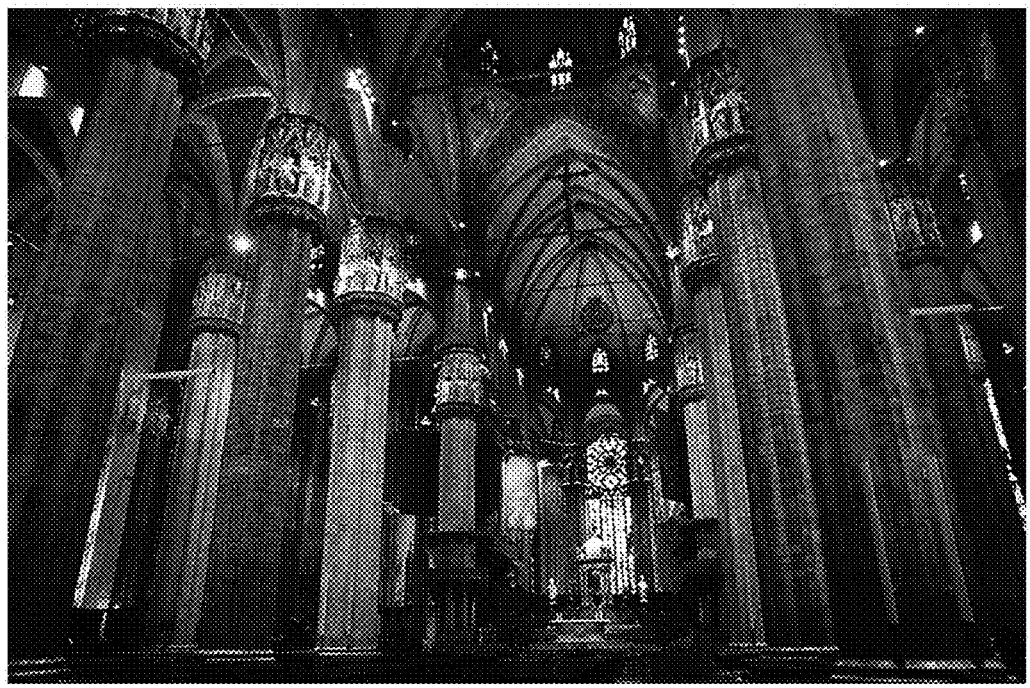
Figure 4:
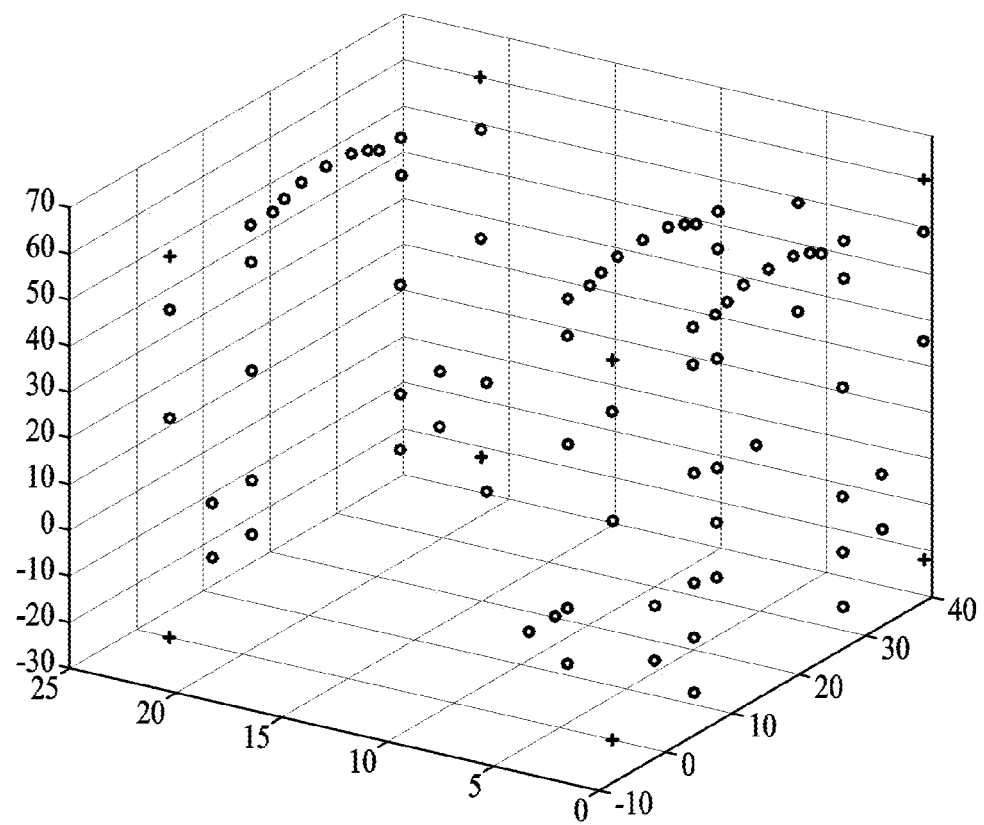
FIG. 4 is a diagram illustrating examples of points defined by mesh data for a church structure of FIGS. 2 and 3 according to an embodiment.
Figure 7:
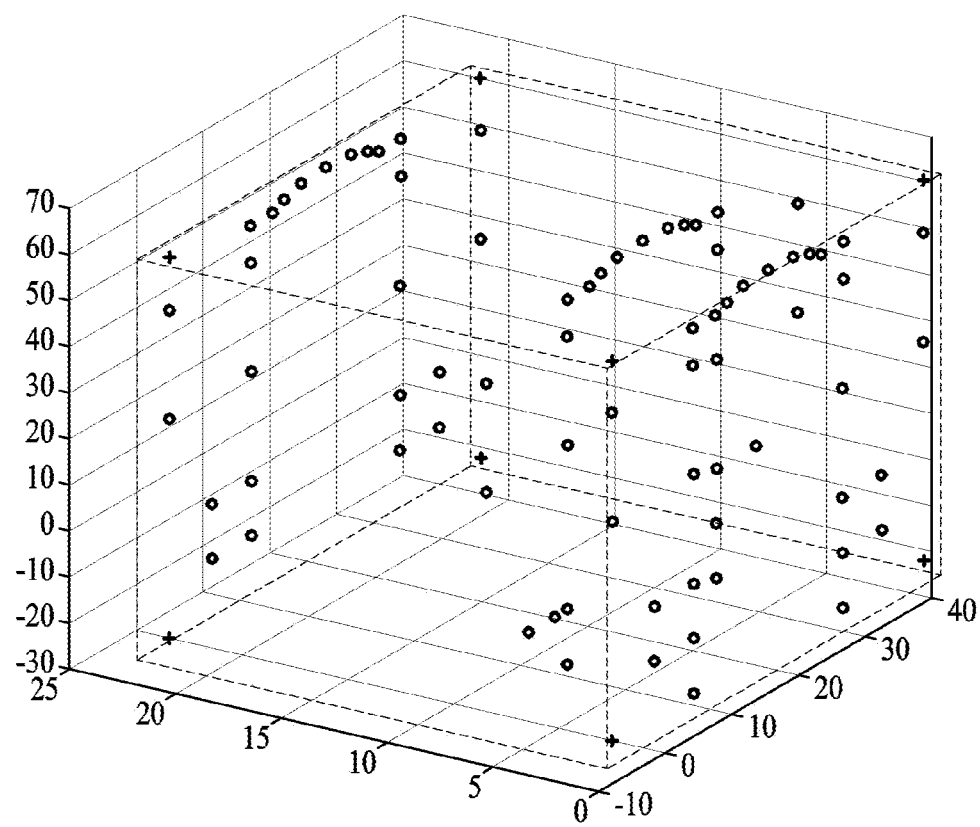
FIG. 7 is a diagram illustrating an example of mesh data newly defined by processing mesh data for a church structure of FIGS. 2 and 3 through procedures described in conjunction with FIGS. 1, 5, and 6 according to an embodiment.

When mesh data is complicated as in the case of the church structure of FIGS. 2 and 3, it may be very difficult to determine whether a listener is inside or outside the building, between pillars, and to which area reverberation information such as reverberation time 60 decibel (dB) (RT60) in the space should be applied. In this case, the amount of computation required for processing an audio signal may be significantly reduced by newly defining mesh data through procedures described in conjunction with FIGS. 1, 5, and 6. FIG. 7 is a diagram illustrating an example of mesh data newly defined by processing mesh data for a church structure of FIGS. 2 and 3 through procedures described in conjunction with FIGS. 1, 5, and 6 according to an embodiment.

Figure 8:
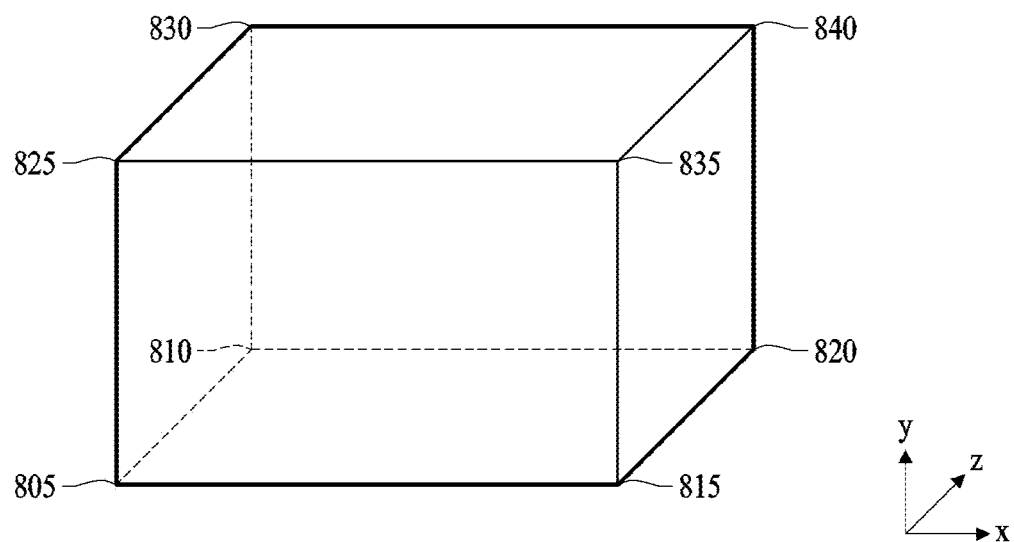
FIG. 8 is a diagram schematically illustrating procedures described in conjunction with FIGS. 1, 5, and 6 according to an embodiment.

FIG. 8 is a diagram schematically illustrating procedures described in conjunction with FIGS. 1, 5, and 6 according to an embodiment.

As shown in FIG. 8, the newly defined mesh data may include a point 805 having a first coordinate including the minimum X coordinate, the minimum Y coordinate, and the minimum Z coordinate, a point 810 having a second coordinate including the minimum X coordinate, the minimum Y coordinate and the maximum Z coordinate, a point 815 having a third coordinate including the maximum X coordinate, the minimum Y coordinate and the minimum Z coordinate, a point 820 having a fourth coordinate including the maximum X coordinate, the minimum Y coordinate and the maximum Z coordinate, a point 825 having a fifth coordinate including the minimum X coordinate, the maximum Y coordinate and the minimum Z coordinate, a point 830 having a sixth coordinate including the minimum X coordinate, the maximum Y coordinate and the maximum Z coordinate, a point 835 having a seventh coordinate including the maximum X coordinate, the maximum Y coordinate and the minimum Z coordinate, and a point 840 having an eighth coordinate including the maximum X coordinate, the maximum Y coordinate and the maximum Z coordinate. Using this simplified mesh data, since it is simple to define whether a listener is included in the space and acts as an obstacle to the structure and defines the space area to which reverberation information such as RT60 is applied, it is possible to significantly reduce the amount of computation required for processing an audio signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The examples described herein may be implemented using hardware components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the to described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of processing mesh data for processing an audio signal for audio rendering in a virtual reality (VR) space, the method comprising:

receiving mesh data configured to define geometry of a certain space, wherein the mesh data comprises data regarding three-dimensional (3D) coordinates of points for configuring spatial information of the certain space;

processing the mesh data by identifying outermost points among the points;

rendering the audio signal based on the processed mesh data; and outputting the rendered audio signal, wherein each of the 3D coordinates comprises an X coordinate, a Y coordinate, and a Z coordinate, and the processing of the mesh data by identifying the outermost points among the points comprises:

defining a coordinate having a minimum value among X coordinates of the 3D coordinates as a minimum X coordinate;

defining a coordinate having a maximum value among the X coordinates of the 3D coordinates as a maximum X coordinate;

defining a coordinate having a minimum value among Y coordinates of the 3D coordinates as a minimum Y coordinate;

defining a coordinate having a maximum value among the Y coordinates of the 3D coordinates as a maximum Y coordinate;

defining a coordinate having a minimum value among Z coordinates of the 3D coordinates as a minimum Z coordinate;

defining a coordinate having a maximum value among the Z coordinates of the 3D coordinates as a maximum Z coordinate; and identifying the outermost points based on the minimum X coordinate, the maximum X coordinate, the minimum Y coordinate, the maximum Y coordinate, the minimum Z coordinate, and the maximum Z coordinate.

2. The method of claim 1, wherein the identifying of the outermost points based on the minimum X coordinate, the maximum X coordinate, the minimum Y coordinate, the maximum Y coordinate, the minimum Z coordinate, and the maximum Z coordinate comprises:

selecting eight points among the points using the minimum X coordinate, the maximum X coordinate, the minimum Y coordinate, the maximum Y coordinate, the minimum Z coordinate, and the maximum Z coordinate.

3. The method of claim 2, wherein the selecting of the eight points among the points using the minimum X coordinate, the maximum X coordinate, the minimum Y coordinate, the maximum Y coordinate, the minimum Z coordinate, and the maximum Z coordinate comprises:

selecting a point having a first coordinate comprising the minimum X coordinate, the minimum Y coordinate, and the minimum Z coordinate;

selecting a point having a second coordinate comprising the minimum X coordinate, the minimum Y coordinate, and the maximum Z coordinate;

selecting a point having a third coordinate comprising the maximum X coordinate, the minimum Y coordinate, and the minimum Z coordinate;

selecting a point having a fourth coordinate comprising the maximum X coordinate, the minimum Y coordinate, and the maximum Z coordinate;

selecting a point having a fifth coordinate comprising the minimum X coordinate, the maximum Y coordinate, and the minimum Z coordinate;

selecting a point having a sixth coordinate comprising the minimum X coordinate, the maximum Y coordinate, and the maximum Z coordinate;

selecting a point having a seventh coordinate comprising the maximum X coordinate, the maximum Y coordinate, and the minimum Z coordinate; and selecting a point having an eighth coordinate comprising the maximum X coordinate, the maximum Y coordinate, and the maximum Z coordinate.

4. A non-transitory computer-readable storage medium storing instructions that, when executed by a processor, cause the processor to perform the method of claim 1.

5. An apparatus for processing mesh data for processing an audio signal for audio rendering in a virtual reality (VR) space, the apparatus comprising:

a memory configured to store instructions; and a processor electrically connected to the memory and configured to execute the instructions, wherein, when the instructions are executed by the processor, the processor is configured to perform a plurality of operations, and wherein the plurality of operations comprises:

receiving mesh data configured to define geometry of a certain space, wherein the mesh data comprises data regarding three-dimensional (3D) coordinates of points for configuring spatial information of the certain space;

processing the mesh data by identifying outermost points among the points;

rendering the audio signal based on the processed mesh data; and outputting the rendered audio signal, wherein each of the 3D coordinates comprises an X coordinate, a Y coordinate, and a Z coordinate, and wherein the processing of the mesh data by identifying the outermost points among the points comprises:

defining a coordinate having a minimum value among X coordinates of the 3D coordinates as a minimum X coordinate;

defining a coordinate having a maximum value among the X coordinates of the 3D coordinates as a maximum X coordinate;

defining a coordinate having a minimum value among Y coordinates of the 3D coordinates as a minimum Y coordinate;

defining a coordinate having a maximum value among the Y coordinates of the 3D coordinates as a maximum Y coordinate;

defining a coordinate having a minimum value among Z coordinates of the 3D coordinates as a minimum Z coordinate;

defining a coordinate having a maximum value among the Z coordinates of the 3D coordinates as a maximum Z coordinate; and identifying the outermost points based on the minimum X coordinate, the maximum X coordinate, the minimum Y coordinate, the maximum Y coordinate, the minimum Z coordinate, and the maximum Z coordinate.

6. The apparatus of claim 5, wherein the identifying of the outermost points based on the minimum X coordinate, the maximum X coordinate, the minimum Y coordinate, the maximum Y coordinate, the minimum Z coordinate, and the maximum Z coordinate comprises:

selecting eight points among the points using the minimum X coordinate, the maximum X coordinate, the minimum Y coordinate, the maximum Y coordinate, the minimum Z coordinate, and the maximum Z coordinate.

7. The apparatus of claim 6, wherein the selecting of the eight points among the points using the minimum X coordinate, the maximum X coordinate, the minimum Y coordinate, the maximum Y coordinate, the minimum Z coordinate, and the maximum Z coordinate comprises:

selecting a point having a first coordinate comprising the minimum X coordinate, the minimum Y coordinate, and the minimum Z coordinate;

selecting a point having a second coordinate comprising the minimum X coordinate, the minimum Y coordinate, and the maximum Z coordinate;

selecting a point having a third coordinate comprising the maximum X coordinate, the minimum Y coordinate, and the minimum Z coordinate;

selecting a point having a fourth coordinate comprising the maximum X coordinate, the minimum Y coordinate, and the maximum Z coordinate;

selecting a point having a fifth coordinate comprising the minimum X coordinate, the maximum Y coordinate, and the minimum Z coordinate;

selecting a point having a sixth coordinate comprising the minimum X coordinate, the maximum Y coordinate, and the maximum Z coordinate;

selecting a point having a seventh coordinate comprising the maximum X coordinate, the maximum Y coordinate, and the minimum Z coordinate; and selecting a point having an eighth coordinate comprising the maximum X coordinate, the maximum Y coordinate, and the maximum Z coordinate.

* * * * *